C. BOWEN.
BUMPER FOR AUTOMOBILES.
APPLICATION FILED OCT. 15, 1919.

1,323,233.

Patented Nov. 25, 1919.

Charles Bowen INVENTOR

BY

A. G. Burns ATTORNEY.

UNITED STATES PATENT OFFICE.

CHARLES BOWEN, OF FORT WAYNE, INDIANA, ASSIGNOR OF ONE-THIRD TO ARTHUR G. NIEBERGALL AND ONE-THIRD TO FRED GASKINS, BOTH OF FORT WAYNE, INDIANA.

BUMPER FOR AUTOMOBILES.

1,323,233.  Specification of Letters Patent.  Patented Nov. 25, 1919.

Application filed October 15, 1919. Serial No. 330,877.

*To all whom it may concern:*

Be it known that I, CHARLES BOWEN, a citizen of the United States of America, and resident of Fort Wayne, in the county of Allen and State of Indiana, have invented certain new and useful Improvements in Bumpers for Automobiles, of which the following is a specification.

This invention relates to improvements in bumpers for automobiles of a type in which the frame of the automobile has a protruding end, and the object of the improvement is to so construct the bumper and its securing means that the bumper may be quickly applied to the frame of the machine without disturbing or altering any of the parts thereof, and so as to obviate the necessity for adjusting means in applying the bumper.

The objects of the invention are accomplished by the construction illustrated in the accompanying drawings in which:—

Similar characters of reference indicate corresponding parts throughout the several views and having reference now to the same.

Figure 1:
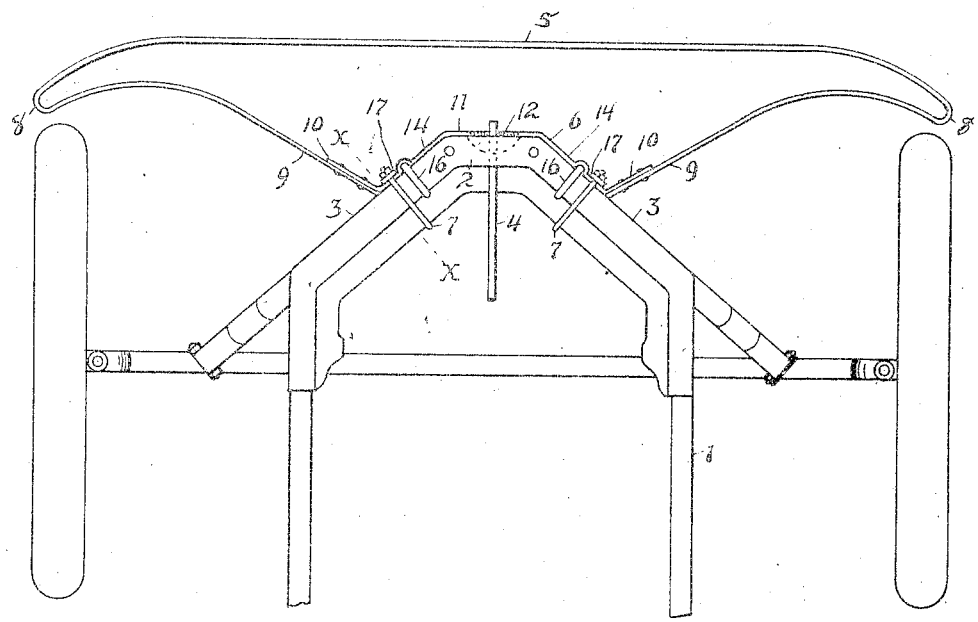
Figure 1 is a plan view of the bumper and a portion of an automobile showing the bumper secured to the protruding end thereof.
Figure 2:
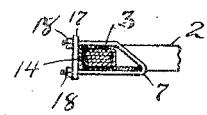
Fig. 2 is a detail view showing a cross-section of the frame and the supporting saddle held in place thereon by the securing means, the section being on the line *x—x* of Fig. 1.
Figure 3:
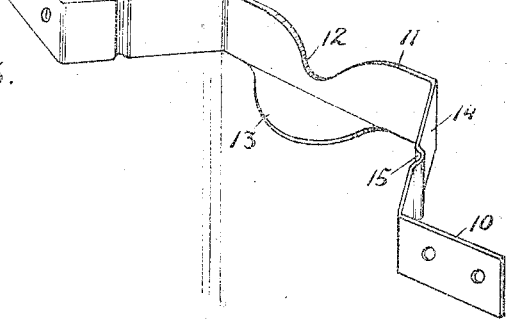
Fig. 3 is a perspective view of the saddle for holding the bumper proper.

1 is the frame of an automobile having a protruding end 2 with divergent opposite sides 3, there being a shaft 4 extending longitudinally through the front end of the frame that serves in starting the automobile engine. The invention is comprised of the bumper proper 5, the saddle 6 and the securing members 7 for the saddle. The bumper proper is formed of a flat bar of spring metal with oppositely projecting hooks 8 and corresponding inwardly slanting extremities 9; the supporting saddle 6 is formed of a stiff metallic plate shaped to fit over the end 2 of the frame and partly over the respective divergent sides 3 thereof, the opposite extremities 10 extending divergently outward from the frame and having supporting connection respectively with the corresponding extremities of the bumper proper, the connection being effected by means of rivets or other permanent securing means. The front middle part 11 of the saddle has a slot 12 that extends through the top of the part, and at the bottom of the part 11 beneath the slot is a rearwardly extending lip 13 adapted to project beneath the frame when the bracket is in position, the slot affording clearance for the starter shaft 4 and the lip serving to prevent the saddle from shifting upwardly and also as a reinforcement for the slotted part 11 of the saddle. The divergent opposite parts 14 are each shaped with a vertical gain 15 upon its inner side adapted to receive the projecting part of the clip 16 on the corresponding divergent side of the frame.

The securing members 7 are each comprised of a clip shaped to encompass the frame and the part 14 of the saddle, and with its ends extending through a clamp-plate 17 that holds the saddle rigidly in position on the frame when the nuts 18 on the respective ends of the clip are tightly drawn.

By forming the saddle so as to straddle the protruding end of the frame with its divergent parts fitting and rigidly secured to the corresponding sides of the frame, and with the inner extremities of the bumper proper rigidly fixed to the projecting ends of the saddle, the bumper is held from displacement.

What I claim is:—

1. In a device of the class described, a bumper proper formed of a metallic spring bar and shaped with oppositely projecting hooks and corresponding inwardly slanting extremities; a saddle having oppositely disposed ends secured respectively to the corresponding extremities of the bumper; and members for supporting the saddle in position.

2. In a bumper for automobiles having a frame with a protruding end, a bumper proper formed of a spring bar shaped with oppositely projecting hooks and corresponding inwardly extending extremities; a saddle shaped to fit the protruding end of the frame and having connections respectively at its opposite ends with the corresponding extremities of the bumper proper; and means for securing the saddle to the frame.

3. In a bumper for automobiles having a frame with a protruding end, a saddle shaped to fit the protruding end and having a recessed middle portion with a rearwardly extending reinforcing lip; a bumper proper having inwardly extending extremities secured respectively to the corresponding ends of the saddle; and means for securing the saddle to the frame.

4. In a bumper for automobiles having a frame with a protruding end, a bumper proper formed of a spring bar with inwardly extending extremities, and a saddle adapted to be secured to the protruding end of the frame and connecting the extremities of the bumper proper.

In testimony whereof I affix my signature, in presence of two witnesses.

CHARLES BOWEN.

Witnesses:
ARTHUR W. PARRY,
WALTER G. BURNS.